(12) United States Patent
Kolla et al.

(10) Patent No.: US 11,511,287 B1
(45) Date of Patent: Nov. 29, 2022

(54) ANNULAR AXIAL MIXING SYSTEM FOR GAS-LIQUID FLOW

(71) Applicant: The University of Tulsa, Tulsa, OK (US)

(72) Inventors: Srinivas Swaroop Kolla, Tulsa, OK (US); Ramin Dabirian, Tulsa, OK (US); Ram S. Mohan, Broken Arrow, OK (US); Ovadia Shoham, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 111 days.

(21) Appl. No.: 17/128,031

(22) Filed: Dec. 19, 2020

Related U.S. Application Data

(60) Provisional application No. 62/953,650, filed on Dec. 26, 2019.

(51) Int. Cl.
| | | |
|---|---|---|
| *B01D 47/00* | (2006.01) | |
| *B04C 9/00* | (2006.01) | |
| *B01D 19/00* | (2006.01) | |
| *B04C 5/103* | (2006.01) | |
| *B04C 5/20* | (2006.01) | |
| *B04C 5/24* | (2006.01) | |
| *B04C 5/04* | (2006.01) | |

(52) U.S. Cl.
CPC ............ *B04C 9/00* (2013.01); *B01D 19/0021* (2013.01); *B01D 19/0057* (2013.01); *B04C 5/04* (2013.01); *B04C 5/103* (2013.01); *B04C 5/20* (2013.01); *B04C 5/24* (2013.01); *B04C 2009/008* (2013.01)

(58) Field of Classification Search
CPC .. B04C 9/00; B04C 5/04; B04C 5/103; B04C 5/20; B04C 5/24; B04C 2009/008; B01D 19/0021; B01D 19/0057
See application file for complete search history.

(56) References Cited

U.S. PATENT DOCUMENTS

| | | | | |
|---|---|---|---|---|
| 2,560,077 A | * | 7/1951 | Bloomer | ................ B01D 45/12 55/455 |
| 3,163,508 A | * | 12/1964 | Gordon | .............. B01D 19/0057 95/242 |

(Continued)

OTHER PUBLICATIONS

Barnea, D.; Shoham, O.; and Taitel, Y.: "Flow Pattern Transition for Vertical Downward Two Phase Flow", Chem. Eng. Sci., 37 (5), pp. 741-744 (1982).

(Continued)

*Primary Examiner* — Dung H Bui
(74) *Attorney, Agent, or Firm* — Head, Johnson, Kachigian & Wilkinson, PC

(57) ABSTRACT

An annular axial mixing system for combined gas and liquid flow. The system includes a gas-liquid separator to separate a multiphase gas and liquid into a gas flow and a liquid flow. A lower leg in communication with the gas-liquid separator is configured to receive liquid flow. An upper leg in communication with the gas-liquid separator is configured to receive gas flow. An annular mixing chamber receives gas from the upper leg. A static liquid chamber, at least a portion of which is within the mixing chamber, is in communication with the lower leg and includes perforations therein to receive gas bubbles from the gas in the annular mixing section chamber in order to mix the flows.

16 Claims, 4 Drawing Sheets

(56) References Cited

U.S. PATENT DOCUMENTS

| | | | | |
|---|---|---|---|---|
| 3,441,135 | A | * | 4/1969 | Lapple .................... B04C 5/24 209/712 |
| 3,664,650 | A | * | 5/1972 | Weber ...................... B04C 9/00 432/68 |
| 3,724,176 | A | * | 4/1973 | Vishnevsky ........... B01D 51/00 55/343 |
| 5,106,514 | A | * | 4/1992 | Alexander ......... B01D 17/0214 95/32 |
| 5,290,431 | A | * | 3/1994 | Cunningham .......... C10G 11/18 502/41 |
| 5,873,469 | A | * | 2/1999 | Stone ....................... B07B 7/06 209/250 |
| 2003/0150324 | A1 | * | 8/2003 | West .................. B01D 17/0211 95/268 |
| 2007/0186772 | A1 | * | 8/2007 | Hoffmann .......... B01D 19/0036 95/266 |
| 2009/0173232 | A1 | * | 7/2009 | Folkvang ................ B04C 5/103 96/182 |
| 2010/0180768 | A1 | * | 7/2010 | Folkvang ................ B04C 5/103 210/194 |
| 2013/0020234 | A1 | * | 1/2013 | Bhattacharyya ....... C10G 25/12 422/187 |
| 2013/0180404 | A1 | * | 7/2013 | Fogelman .......... B01D 19/0057 95/266 |
| 2014/0345649 | A1 | * | 11/2014 | Jung ........................ B04C 9/00 134/13 |
| 2015/0273484 | A1 | * | 10/2015 | Ho ........................... B04C 3/04 55/321 |
| 2019/0022565 | A1 | * | 1/2019 | Dabirian ................ B01D 45/16 |
| 2019/0293522 | A1 | * | 9/2019 | Wiederin ............... B01D 45/12 |
| 2019/0321833 | A1 | * | 10/2019 | Lu ............................. B04C 3/06 |
| 2021/0214255 | A1 | * | 7/2021 | Steward ................... B04C 3/04 |

OTHER PUBLICATIONS

Jamialahmadi, M.; Zehtaban, M. R.; Muller-Steinhagen, H. et al.: Study of Bubble Formation under Constant Flow Conditions. Chem. Eng. Res. Des., 79 (A5), 523 (2001).

Taitel, Y.; Barnea, D.; and Dukler, A.E.: "Modeling Flow Pattern Transition for Steady Upward Gas-Liquid Flow in Vertical Tubes," AIChE J., 26, No. 3, pp. 345-354 (1980).

Barnea, D.; Shoham, O.; and Taitel; Gas-Liquid Flow in Inclined Tubes: Flow Pattern Transitions for Upward Flow, Chem. Eng. Sci., 40 (1), pp. 131-136, (1985).

Brodkey, Robert S.; The Phenomena of Fluid Motions, https://fluiddynamics.osu.edu/phenomena-fluid-motions.

* cited by examiner

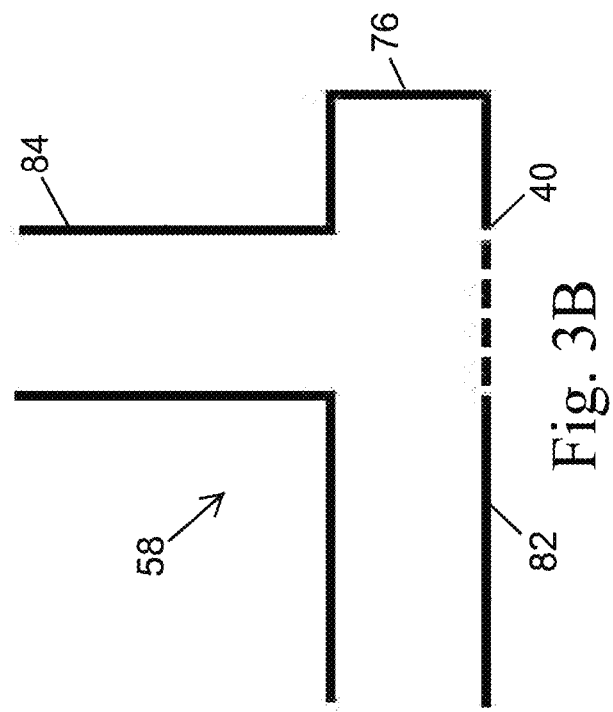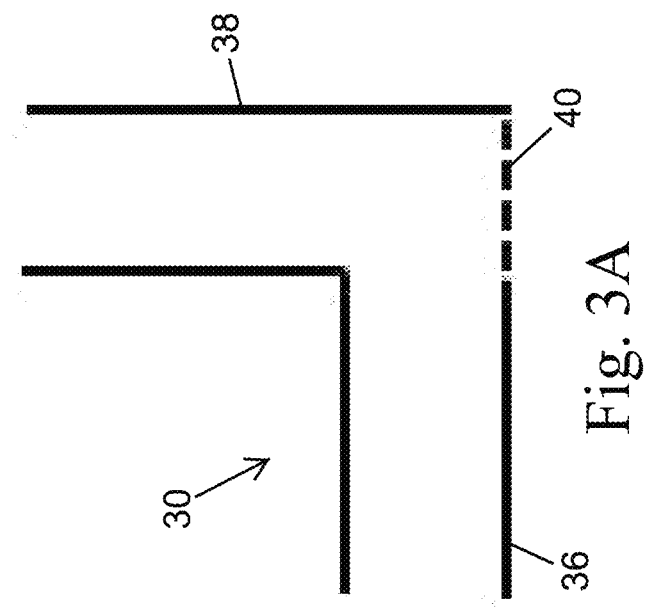

ANNULAR AXIAL MIXING SYSTEM FOR GAS-LIQUID FLOW

CROSS-REFERENCE

This application is based on and claims priority to U.S. Provisional Patent Application Ser. No. 62/953,650, filed Dec. 26, 2019, which is incorporated herein in its entirety by reference.

BACKGROUND OF THE INVENTION

2. Field of the Invention

The present invention is directed to a mixing system for mixing of gas and liquid phases of a fluid for processing and transportation applications. In particular, the present invention is directed to an annular axial mixing system to accommodate mixing of any multiphase flow pattern.

3. Description of the Related Art

Many gas-liquid two-phase flow applications in the energy industry, such as in the petroleum industry, require mixing of the gas and liquid phases upstream of production systems. If the gas and liquid phases are not properly mixed, problems can arise. One non-limiting example is severe-slugging (long liquid slugs followed by gas pockets) which occurs in a pipeline/riser system upstream of an offshore platform leading to operational problems. Mixing of the flow upstream of the pipeline/riser eliminates the cyclic flow behavior of severe-slugging, ensuring continuous flow in the riser. Another non-limiting example is a multiphase pump that typically breaks down in the presence of high gas void fraction flow (such as slug and annular regimes), which may result in heating and locking of the multiphase pump. For these and other applications, it is desirable to provide upstream mixing of the gas and liquid phases to eliminate the above-stated problems.

The present invention is a novel annular axial mixing system for gas-liquid flow, where the gas and liquid phases are mixed by utilizing a separator that is equipped and in communication with an annular axial mixing chamber. One unique aspect of the system is its capability to handle the mixing of any multiphase flow pattern. Two embodiments of the system of the invention are proposed, where the first configuration is most suitable for eliminating severe-slugging in a pipeline/riser system by mixing the multiphase flow, while the second configuration can be utilized for mixing multiphase flow upstream of multiphase pumps.

A gas-liquid cylindrical cyclone compact separator is employed in a preferred embodiment. It may be noted that a gas-liquid cylindrical cyclone compact separator can be replaced by any other type of separator (such as a conventional horizontal or vertical gravity separator) within the scope of the present invention.

It is, therefore, a principal object and purpose of the present invention to provide a mixing system for gas-liquid flow that accommodates a wide range of multiflow patterns.

SUMMARY OF THE INVENTION

The present invention is directed to an annular axial mixing system for mixing of gas and liquid phases.

The annular axial mixing system includes a gas-liquid cylindrical cyclone separator which utilizes both centrifugal forces and gravity forces to separate the gas and liquid phases. Incoming gas and liquid multiphase fluid flow enters the system through a separator inlet and thereafter to a vertical body having an aligned upper leg and a lower leg through a tangential reduced area inlet section of the separator. After separation, liquid flows into a lower leg of the body while gas flows into an aligned upper leg of the body.

The gas from the upper leg flows into an enlarged tubular section configured in the form of an annular axial mixing chamber. The liquid in the lower leg is passed into a static liquid chamber having a tubular horizontal portion and a tubular vertical portion.

A liquid control valve is installed on the lower leg upstream of the annular mixing chamber. The liquid control valve works in conjunction with a differential pressure transducer which is installed across the body to maintain a desired liquid level in the body.

The horizontal tubular portion of the static liquid chamber is in communication with and passes into the annular mixing chamber. The vertical tubular portion of the static liquid chamber is axially aligned with the annular axial mixing chamber and passes outward therefrom. Gas in the annular mixing chamber bubbles up into the liquid phase in the static liquid chamber through a series of perforations located at the bottom of the horizontal tubular portion inside the annular mixing chamber. The perforations in the static liquid chamber are designed in accordance with the teachings of the present invention. This causes the gas phase to be broken into small gas bubbles, providing an efficient mixing of the phases.

BRIEF DESCRIPTION OF THE DRAWINGS

FIG. 3A and FIG. 3B illustrate alternate configurations of a static liquid chamber for either embodiment of the annular axial mixing system.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figures 1A, 1B:
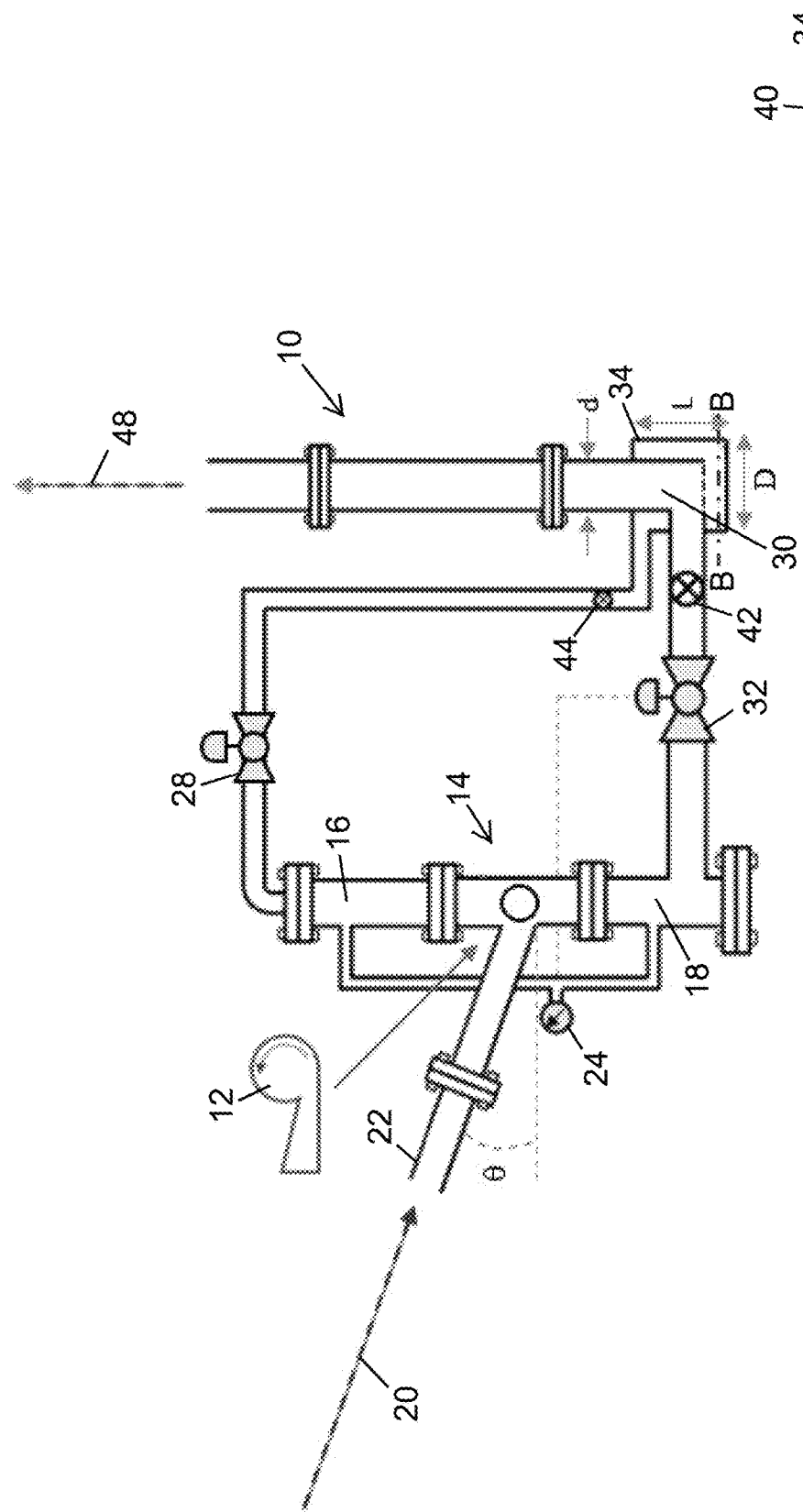
FIG. 1A and FIG. 1B illustrate simplified schematic diagrams of a first preferred embodiment of an annular axial mixing system for gas-liquid flow as set forth in the present invention.

Referring to the drawings in detail, FIG. 1A illustrates a simplified schematic diagram of a first preferred embodiment of an annular axial mixing system 10, which aims at ensuring mixed flow in risers. In one preferred embodiment, the system 10 eliminates severe-slugging that may occur, for example, in a pipeline/riser system upstream of an offshore platform. The system 10 includes a gas-liquid cylindrical cyclone having a separator inlet 12 (a portion shown exploded). The separator utilizes both centrifugal forces and gravity forces to separate the gas and liquid phases. Incoming gas and liquid multiphase flow enters the system 10 as shown by arrow 20 through an inlet pipe 22. The multiphase flow passes into a vertical body 14 having an aligned upper leg 16 and a lower leg 18, through an inclined, tangential reduced area inlet section of the separator at an inclination angle (θ) between 20° and 35°, and a recommended angle of approximately 27°, to the horizontal.

The separator includes a tangential inlet nozzle, with an opening of between 20% to 35%, and a recommended area of approximately 25%, of the inlet section cross-sectional area of the inlet pipe 22, located at the end of the inlet pipe. FIG. 4A illustrates an enlarged diagrammatic view of the separator inlet 12, the inlet pipe 22 and the body 14 apart from the system 10. The arranged combination of the inlet pipe 22, the separator inlet 12 and the body 14 causes the gas and liquid to separate.

Figure 4B:
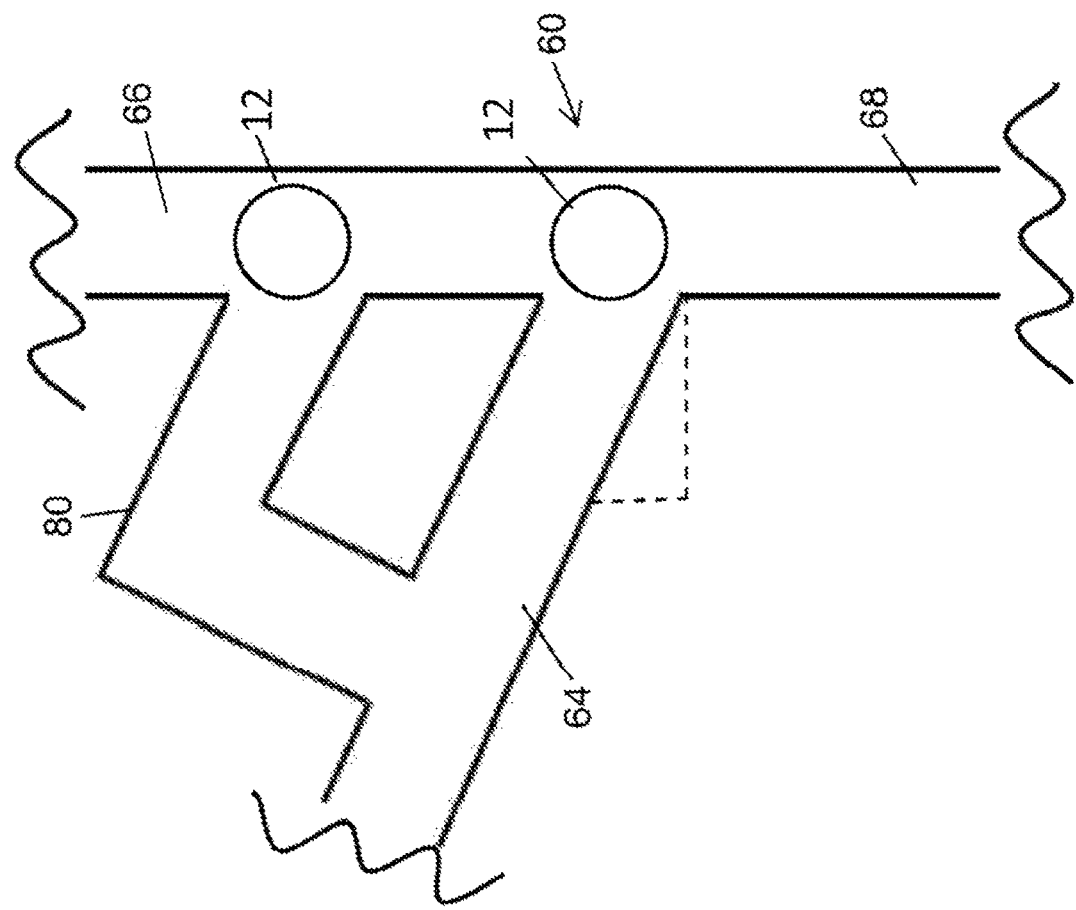
FIG. 4A and FIG. 4B illustrate alternate embodiments of a cyclone separator along with a body for either embodiment of the annular axial mixing system.
Figure 4A:
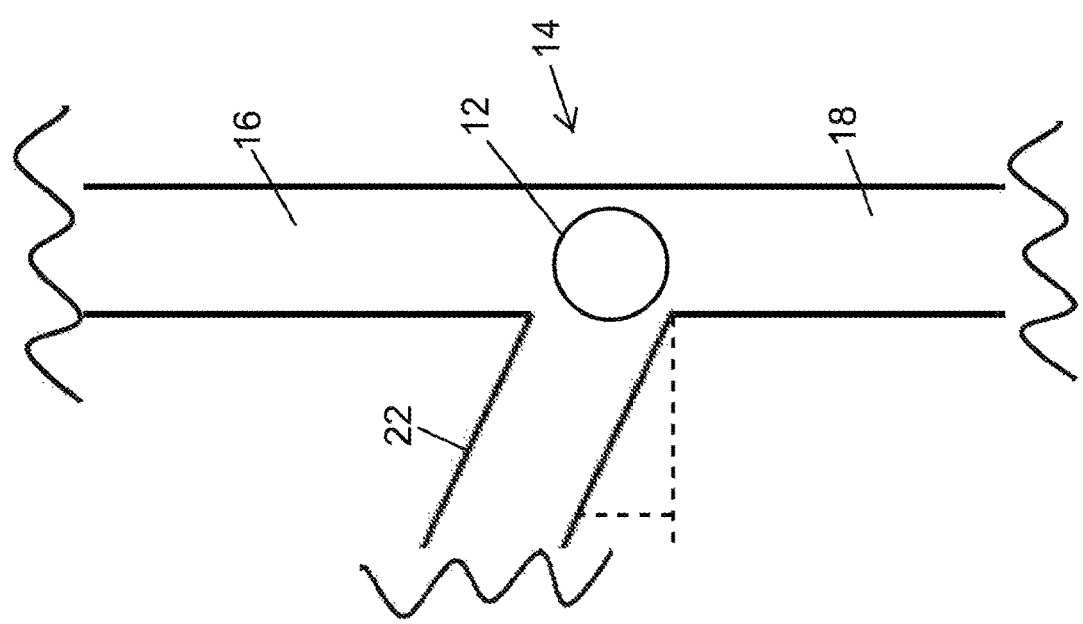

An alternate separator inlet configuration is shown in FIG. 4B. In cases of high gas loading, an optional dual inlet separator, as seen in FIG. 4B, can also be utilized instead of a single inlet separator where pre-separation of gas helps in improved separation. Gas will migrate from the inlet pipe 64 through a secondary inlet 80 to an upper leg 66 of the body 60. It will be appreciated that either configuration of the separator inlet may be used with either embodiment of the system.

Returning to a consideration of the embodiment in FIG. 1A, the inlet nozzle of the separator carries the flow tangentially into the separator, producing swirling centrifugal force, which separates the gas and liquid phases radially. After separation, liquid flows into a lower leg 18 of the body 14 while gas flows into an aligned upper leg 16 of the body 14.

As seen in FIG. 1A, the gas from the upper leg 16 flows into an enlarged tubular section configured in the form of an annular axial mixing chamber 34. The axial mixing chamber 34 is generally in the shape of a cylinder. The liquid in the lower leg 18 is passed into a static liquid chamber 30. As best seen in the enlarged diagrammatic view in FIG. 3A, the static liquid chamber 30 includes a tubular horizontal portion 36 and a tubular vertical portion 38. The horizontal tubular portion 36 enters and terminates inside the mixing chamber 34 (not seen in FIG. 3). The vertical tubular portion 38 begins in and exits the mixing chamber 34. The vertical tubular portion 38 is axially aligned with the annular axial mixing chamber 34.

Returning to a consideration of FIG. 1A, a liquid control valve 32 is installed on the lower leg 18 upstream of the annular mixing chamber 34. The liquid control valve 32 works in conjunction with and is in communication with a differential pressure transducer 24, which is installed across the body 14, to maintain the desired liquid level in the body 14. The liquid level is maintained below the junction of the inlet pipe 22 with the separator inlet 12 and, in a preferred embodiment, at approximately 6 inches below the separator inlet 12 for proper operation of the separator.

A main function of the liquid control valve 32 is to address large gas pocket production into the separator inlet 12, which can result in gas pocket carry-under in the liquid lower leg 18 and in the riser. This is not a desirable phenomenon as the carried-under gas pocket in the riser can promote severe-slugging. This is prevented by the liquid control valve 32 that maintains a liquid level by controlling the hydrostatic head of the liquid in the body 14, which in turn avoids the penetration of the gas pocket into the lower liquid leg 18. If the liquid level in the separator drops down, the liquid control valve 32 will close to bring the level up by reducing the liquid leaving the body. If the liquid level rises, the liquid control valve 32 will open to reduce the liquid level by allowing more liquid to flow out of the lower leg 18.

A secondary function of the liquid control valve 32 is to maintain proper operation of the separator by avoiding liquid carry-over into the gas upper leg 16 or gas carry-under into the liquid leg 18 under normal flow conditions, excluding the production of large gas pockets into the separator.

Complete separation of the phases is not required in the separator, whereby some liquid carry-over and gas-carry-under can be tolerated, not affecting the performance of the system 10.

An optional gas control valve 28 on the upper gas leg 16 could be used as needed. For example, if under certain conditions the liquid flow rate exceeded the flow permitted by the diameter of the liquid leg 18, the gas control valve 28 and the liquid control valve might be utilized to control liquid level. Both the gas control valve 28 and the liquid control valve 32 could be connected to and in communication with a controller (not shown).

In addition, two one-way check valves 42 and 44 are installed upstream of the annular axial mixing chamber 34. One check valve 44 in the gas line is provided to avoid backflow of liquid into the gas line, while the other check valve 42 is installed in the lower liquid leg 18 to prevent backflow of gas or liquid into the liquid line.

The static liquid chamber 30 is within the annular mixing chamber 34, such that the axis of the static liquid chamber 30 is concentric with the annular mixing chamber The gas in the annular mixing chamber 34 bubbles up into the liquid phase in the static liquid chamber 30 through perforations 40 located at the bottom of the horizontal tubular portion of the elbow inside the annular axial mixing chamber 30, as best seen in the sectional view in FIG. 1B taken along section line B-B of FIG. 1. This arrangement causes the gas phase to be broken into small gas bubbles, providing an efficient mixing of the phases and avoiding production of large gas pockets at the bottom of the riser, which can cause severe-slugging in the riser. Thus, the annular mixing chamber 34 ensures thorough mixing of the gas and the liquid phases and a continuous, non-cyclic, multiphase flow in the riser as shown at arrow 48.

Figure 2A:
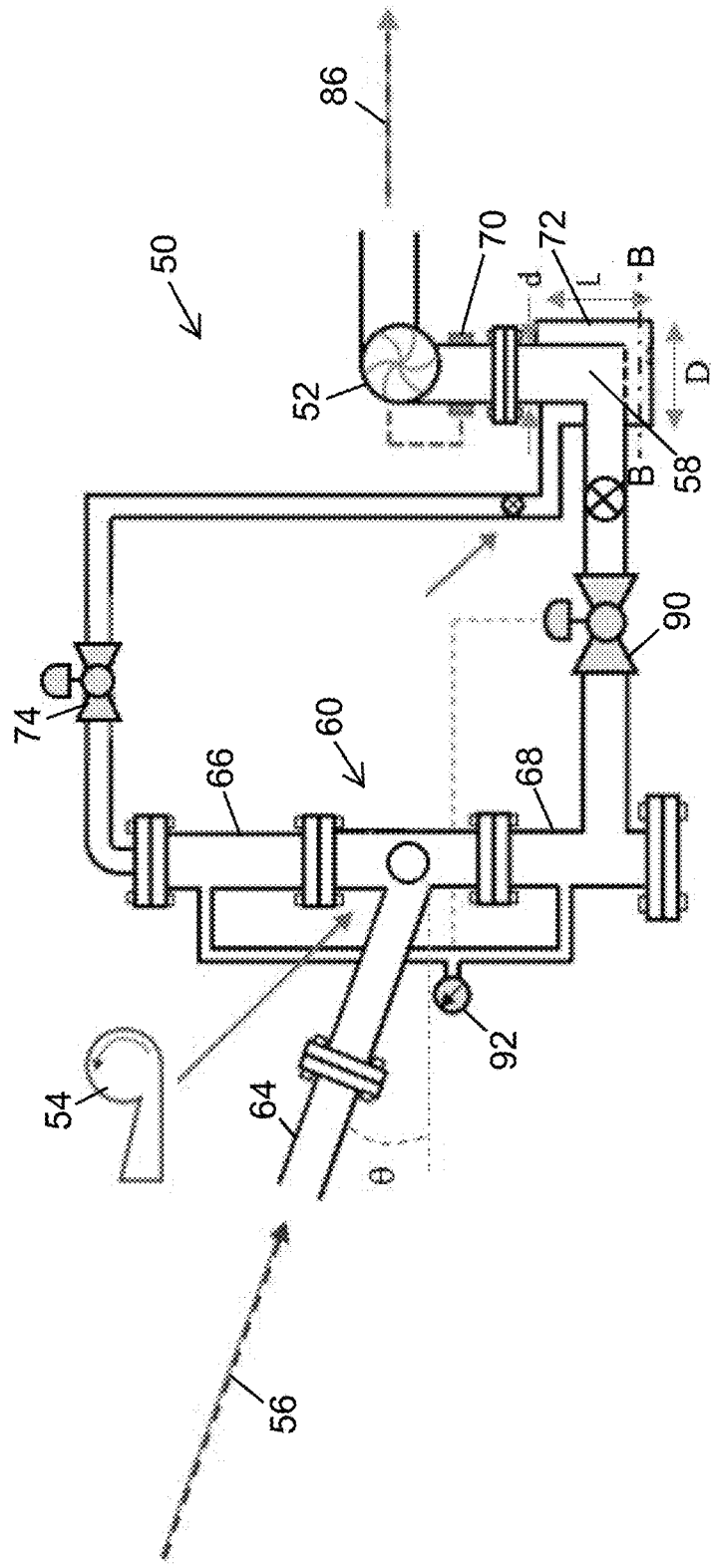
FIG. 2A and FIG. 2B illustrate simplified schematic diagrams of a second preferred embodiment of the annular axial mixing system for gas-liquid flow.
Figure 2B:
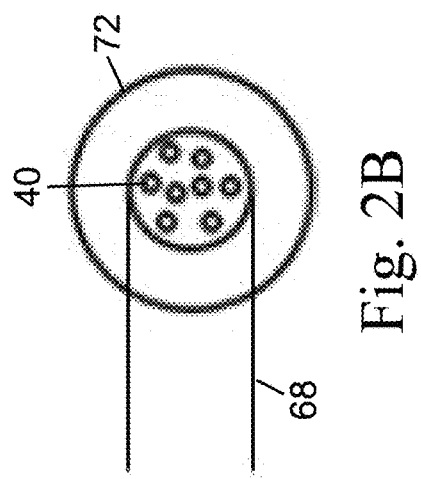

A second preferred embodiment of the annular axial mixing system 50 shown in FIGS. 2A and 2B is utilized to mix multiphase flow upstream of a multiphase pump 52 or multiphase pumps and ensures the presence of liquid at all times at the pump suction to avoid heating and failure of the pump. For this embodiment, the multiphase flow pump 52 is equipped with a variable frequency drive. A simplified schematic diagram of the system 50 is presented in FIGS. 2A and 2B. Incoming gas and liquid multiphase flow enters the system 50 through an inlet pipe 64 as shown by arrow 56. A gas-liquid cylindrical cyclone having a separator inlet 54 (a portion shown exploded) separates gas and liquid. The system 50 utilizes both centrifugal and gravity forces to separate the gas and liquid phases. The flow passes into a vertical body 60 having an aligned upper leg 66 and a lower leg 68, through an inclined, tangential reduced area inlet section of the separator at an inclination angle (θ) between 20° to 35°, and a recommended angle of approximately 27° to the horizontal.

The separator includes a tangential inlet nozzle, with an opening of between 20% to 35%, and a recommended area of approximately 25%, of the inlet section cross-sectional area of the inlet pipe 64.

Returning to a consideration of FIG. 2A, a liquid control valve 90 is installed on the lower leg 68 upstream of the annular mixing chamber 72. The liquid control valve 90 works in conjunction with and is in communication with a differential pressure transducer 92, which is installed across the body 60, to maintain the desired liquid level in the body 60. The liquid level is maintained below the junction of the inlet 64 with the separator inlet 12 and, in a preferred embodiment, at approximately 6 inches below the inlet 64 for proper operation of the separator.

Gas from the upper leg 66 flows into an enlarged tubular section configured in the form of an annular mixing chamber 72. Liquid in the lower leg 68 is passed to a static liquid chamber 58. The static liquid chamber 58 includes a horizontal tubular portion 82, a vertical tubular portion 84, and a dead-end T-junction.

The static liquid chamber 58 is within the annular mixing chamber 72. The gas in the annular mixing chamber 72 bubbles up into the liquid phase in the static liquid chamber 58 through perforations 40 located at the bottom of the horizontal tubular portion 82 inside the annular axial mixing chamber 72, as best seen in the sectional view in FIG. 2B taken along section line A-A of FIG. 2A. This arrangement causes the gas phase to be broken into small gas bubbles, providing an efficient mixing of the phases and avoiding production of large gas pockets at the bottom of the riser, which can cause severe-slugging in the riser. Thus, the annular mixing chamber 34 ensures thorough mixing of the gas and the liquid phases and a continuous, non-cyclic, multiphase flow as shown by arrow 86.

The main difference between the two embodiments is the installation of a liquid holdup sensor 70 between the annular mixing chamber 72 and the pump 52, which is connected to the variable frequency drive of the pump 52. When the liquid holdup sensor 70 records gas void fractions greater than 25%, the pump speed is reduced by the variable frequency drive. The multiphase pump 52 is completely shut off in the event gas void fraction becomes greater than 75%. This prevents the multiphase pump from running "dry", which can result in the pump overheating and locking, leading to failure.

It is recommended that the multiphase pump 52 be installed at approximately the same height as the liquid level in the body 60, namely, approximately 6 inches below the inlet.

Installation of a gas control valve 74 on the gas lower leg is optional for the second preferred embodiment of the system 50 as well.

Also optional for both embodiments is the substitution of the elbow of the static liquid chamber by a dead-end T-junction 76 or any other extension with a horizontal portion 82 and a vertical portion 84, as shown in FIG. 3B.

It is recommended that the volume of the annular region of the annular axial mixing chamber be the same as that of the core region below the multiphase pump.

In a preferred configuration in either embodiment, the internal diameter (D) of annular mixing chamber will be approximately twice the vertical tubular portion diameter (d). In addition, the height (L) of the annular mixing chamber 34 will be approximately four times the vertical tubular riser diameter (d).

The perforations 40 in the static liquid chamber 58 or 30 have been designed to enhance mixing. For bubble flow in a vertical pipe, the critical bubble diameter ($d_b$), below which the bubbles do not coalesce, as per Barnea et al. (1985), is given by $$d_b = 2\left[\frac{0.4\sigma}{(\rho_L - \rho_G)g}\right]^{0.5} \quad (1)$$

Where σ is the surface tension of the liquid, $\rho_a$ is the density of the liquid, $\rho_G$ is the density of the gas and g is the acceleration due to gravity.

The ratio of the bubble diameter to the perforation diameter (through which the bubble is formed) can be determined from Jamialahmadi et al. (2001), where the maximum perforation diameter ($d_{pr}$) can be solved as follows:

$$d_{pr} = d_b\left[\frac{5.0}{BO^{1.08}} + \frac{9.261FR^{0.36}}{GA^{0.39}} + 2.147FR^{0.51}\right]^{-\frac{1}{3}} \quad (2)$$

Where $d_b$ is the bubble diameter, BO is Bond number, GA is Galileo number and FR is Froude number.

In continuum mechanics, the Froude number (FR) is a dimensionless number defined as the ratio of the inertia force to the gravitational force. In fluid dynamics, the Galileo number (Ga) is defined as the ratio of gravitational force to the viscous force and the Bond number (BO) represents the ratio of gravitational force to surface tension force.

The definition of the void fraction is used in order to predict the maximum number of perforations required to efficiently convert the slug flow pattern into bubble flow. The void fraction for bubble flow is defined as, $$\alpha = \frac{nA_b}{A_p} \quad (3)$$

where n is the number of perforations, $A_b$ is the cross-sectional area of a gas bubble, and $A_p$ is the cross-sectional area of the pipe. Substituting for the cross-sectional areas of the bubble and the pipe into Eq. (3) and solving for the number of perforation results in $$n = \frac{\alpha d_p^2}{d_b^2} \quad (4)$$

where $d_p$ is the pipe diameter.

Taitel et al. (1980) proposed that the transition from bubble flow to slug flow occurs when the gas void fraction (a) increases to 0.25. Thus, for bubble flow to exist downstream of the annular mixing chamber 34 or 72, the gas void fraction should be less than 0.25, which limits the number of perforations. Substituting the bubble diameter from Eq. (1) and α=0.25 into Eq. (4) results in the maximum number of perforations required, namely, $$n = 0.156 d_p^2\left[\frac{(\rho_L - \rho_G)g}{\sigma}\right] \quad (5)$$

Utilizing the foregoing, the design of the perforations 40 in the static liquid chamber 30 or 58 will be maximized to mix flow.

Whereas, the invention has been described in relation to the drawings attached hereto, it should be understood that other and further modifications, apart from those shown or suggested herein, may be made within the scope of this invention.

REFERENCES

Barnea, D., Shoham, O., and Taitel, Y.: "Flow Pattern Transition for Vertical Downward Two Phase Flow", *Chem. Eng. Sci.*, 37 (5), pp. 741-744 (1982)

Jamialahmadi, M.; Zehtaban, M. R.; Muller-Steinhagen, H. et al., Study of Bubble Formation under Constant Flow Conditions. *Chem. Eng. Res. Des.*, 79 (A5), 523 (2001)

Taitel, Y. Barnea, D. and Dukler, A. E.: "Modeling Flow Pattern Transition for Steady Upward Gas-Liquid Flow in Vertical Tubes," *AIChE J.*, 26, no. 3, pp. 345-354 (1980)

What is claimed is:

1. An annular axial mixing system for combined gas and liquid flow, which system comprises:
   a gas-liquid separator to separate a multiphase gas and liquid into a gas flow and a liquid flow;
   a lower leg in communication with said gas-liquid separator configured to receive liquid flow;
   an upper leg in communication with said gas-liquid separator configured to receive gas flow;
   an annular mixing chamber configured to receive said gas from said upper leg; and
   a static liquid chamber in communication with said lower leg, said static liquid chamber having perforations therein configured to receive gas bubbles from said gas in said annular mixing section chamber and wherein said gas-liquid separator is a cylindrical cyclone separator.

2. The annular axial mixing system as set forth in claim 1 wherein said cylindrical cyclone separator is at an inclination angle of between 20 and 35 degrees from horizontal to said upper leg and lower leg.

3. The annular axial mixing system as set forth in claim 2 wherein said cylindrical cyclone separator is at an inclination angle of approximately 27 degrees.

4. The annular axial mixing system as set forth in claim 1 wherein said static liquid chamber has a tubular horizontal portion and a tubular vertical portion and where said perforations are in said horizontal portion beneath said vertical portion.

5. The annular axial mixing system as set forth in claim 4 including a multiphase flow pump with a variable frequency drive in communication with said tubular vertical portion.

6. The annular axial mixing system as set forth in claim 4 wherein said annular mixing chamber has a diameter approximately twice the diameter of said vertical portion of said static mixing chamber.

7. The annular axial mixing system as set forth in claim 4 wherein the height of the annular mixing chamber is approximately four times the diameter of the vertical portion of the static mixing chamber.

8. The annular axial mixing system as set forth in claim 1 wherein said static liquid chamber is configured in the form of an elbow.

9. The annular axial mixing system as set forth in claim 1 wherein said static liquid chamber is configured in the form of a T-junction.

10. The annular axial mixing system as set forth in claim 1 including a liquid control valve in said lower leg between said gas-liquid separator and said static liquid chamber.

11. The annular axial mixing system as set forth in claim 10 including a differential pressure transducer between said lower leg and said upper leg and wherein said differential pressure transducer is in communication with said liquid control valve.

12. The annular axial mixing system as set forth in claim 1 including a one-way check valve in said lower leg and a one-way check valve in said upper leg.

13. The annular axial mixing system as set forth in claim 1 wherein a liquid level in said static liquid chamber is below said separator.

14. The annular axial mixing system as set forth in claim 1 wherein said multiphase gas and liquid enters said gas-liquid separator through an inlet pipe and wherein said separator includes an inlet nozzle having a cross-sectional area opening between 20 to 30 percent of the cross-sectional area of said inlet pipe.

15. The annular axial mixing system as set forth in claim 14 wherein said cross-sectional area opening is approximately 27 percent.

16. The annular axial mixing system as set forth in claim 1 wherein said perforations in said static liquid chamber have maximum diameters ($d_{pr}$) of:

$$d_{pr} = d_b \left[ \frac{5.0}{BO^{1.08}} + \frac{9.261 FR^{0.36}}{GA^{0.39}} + 2.147 FR^{0.51} \right]^{-\frac{1}{3}}$$

Where $d_b$ is gas bubble diameter, BO is Bond number, GA is Galileo number, and FR is Froude number.

* * * * *